United States Patent
Miki et al.

[11] Patent Number: 4,504,099
[45] Date of Patent: Mar. 12, 1985

[54] DRIVE-AXLE BEARING DEVICE FOR AUTOMOBILES

[75] Inventors: Yutaka Miki, Kawanishi; Masayuki Kuroda, Takarazuka; Tetsumi Omori, Nishinomiya, all of Japan

[73] Assignee: NTN Toyo Bearing Company, Limited, Osaka, Japan

[21] Appl. No.: 616,779

[22] Filed: Jun. 1, 1984

Related U.S. Application Data

[63] Continuation of Ser. No. 403,631, Jul. 20, 1982, abandoned.

[30] Foreign Application Priority Data

Jan. 26, 1981 [JP] Japan ................................ 56-10639

[51] Int. Cl.³ .................... F16C 19/08; F16C 3/035; F16D 3/46; B60B 35/12
[52] U.S. Cl. .................................... 384/543; 180/259; 280/96.1; 464/178; 384/544
[58] Field of Search ............... 308/191, 190, 193, 195, 308/208, 209, 210, 212; 464/178, 146, 141; 280/96.1; 180/259, 70 R

[56] References Cited

U.S. PATENT DOCUMENTS

| | | | |
|---|---|---|---|
| 3,557,572 | 1/1971 | Aucktor et al. | 464/146 |
| 3,583,511 | 6/1971 | Asberg | 308/191 X |
| 4,090,751 | 5/1978 | Krude | 464/178 X |
| 4,094,376 | 6/1978 | Welschof | 308/191 X |
| 4,129,345 | 12/1978 | Krude | 308/191 |

FOREIGN PATENT DOCUMENTS 1416989 12/1975 United Kingdom .

Primary Examiner—Stuart S. Levy
Assistant Examiner—Thomas R. Hannon
Attorney, Agent, or Firm—Armstrong, Nikaido, Marmelstein & Kubovcik

[57] ABSTRACT

A bearing device for supporting an axle of an automobile comprises an outer member(B) having two races formed on the inner peripheral surface thereof and also having a radial flange integrally formed thereon for connection to a vehicle, an inner shaft member(A) having one end integrally formed with a radial flange for attachment of a wheel and the other end provided with the inner joint member(28, 280) of a constant velocity universal joint and also having two races formed on the outer peripheral surface thereof, and two rows of rolling elements(C) interposed between the races of the outer member and inner shaft member. The device is designed for simple construction and easy machining and assembly.

2 Claims, 4 Drawing Figures

DRIVE-AXLE BEARING DEVICE FOR AUTOMOBILES

This is a continuation of application Ser. No. 403,631, filed July 20, 1982, now abandoned.

This invention relates to a bearing device for supporting an axle of an automobile. More particularly, it relates to a drive-axle bearing device for an automobile, e.g., a front-wheel-drive car or a four-wheel-drive car, intended to facilitate engineering design to a great extent.

FIG. 1 shows a drive-axle bearing device which presently is in use. A hub 4 fitted on an axially extending stem 3 integral with the outer member 2 of a constant velocity universal joint 1, and the inner member 7 of a double-row angular ball bearing 6 is fitted on the axial extension 5 of the hub 4, with the outer member 10 of the bearing 6 being fixed in position by stop rings 9, 9 fitted in a knuckle 8, said hub being clamped on the stem 3 by a nut 11, thereby completing the assembly.

In the above device, however, since the stem 3 integrally attached to the outer member 2 of the constant velocity universal joint 1, the hub 4, and the bearing 6 are each separate members, the construction of the bearing and its peripheral members is complicated; these parts are high-precision parts needing careful handling.

In this type of drive-axle bearing device, one which is designed for easy replacement to provide against a failure taking place in the bearing portion is already known in U.S. Pat. No. 3,583,511. This device comprises an axially extending shaft portion integral with the outer member of a constant velocity universal joint, a flange for attachment to a wheel inseparably joined to an extension of the shaft portion, this extension having a race surface formed thereon for the rolling elements of a bearing to serve as the inner member of the bearing, and a flange for attachment to a vehicle integrally formed on the outer member of the bearing.

In the drive-axle bearing device described above, the outer member of the constant velocity universal joint, the bearing and the flange for attachment to a wheel are inseparably integrally joined together, with the result that even if damage is caused only to the bearing portion or the ball race surface of the outer member of the constant velocity universal joint, it is necessary to replace the unit including the outer joint member of the constant velocity universal joint after removing the wheel and brake plate or brake drum. Further, the outer member of the constant velocity universal joint is generally of bowl shape; thus, formation of a race for balls for transmission of torque on the inner concave surface of the bowl and an inner race surface for the high-precision bearing on a portion of the shaft integral with the outer member would involve difficulty in machining and in selection of material and would result in heat treatment deformation.

This invention contemplates to provide a bearing device capable of eliminating the above drawbacks in the conventional bearing device of the described type.

To this end, a drive-axle bearing device for automobiles according to the invention comprises an outer member having two races on the inner peripheral surface thereof and a radial flange integrally formed thereon for attachment to a vehicle, an inner shaft member having one end integrally formed with a radial flange for attachment to a wheel and the other end provided with the inner joint member of a constant velocity universal joint and also having two races formed on the outer peripheral surface thereof, and two rows of rolling elements interposed between the races of the outer member and the inner shaft member. This arrangement extremely simplifies the construction of the bearing device and enables reduction of size contributing to reduction of the weight of the automobile and making it possible to apply the device to wheels of small diameter. Further, since the bearing device is a single unit adapted to be removably connectible at the spindle portion to the constant velocity universal joint, if the bearing is damaged it is only necessary to replace the bearing device section, and moreover it can be replaced as a single unit, thus facilitating the replacement operation.

According to another embodiment of the invention, the inner shaft portion is integrally formed with the inner joint member of the constant velocity universal joint, thus saving the heretofore needed welding of the two parts together and hence avoiding the lowering of accuracy concomitant with the welding. Further, this arrangement reduces the number of parts, simplifies assembly operation and reduces cost.

These and other objects and features of the invention will become more apparent from the following description to be given with reference to the accompanying drawings, in which.

Figure 1:
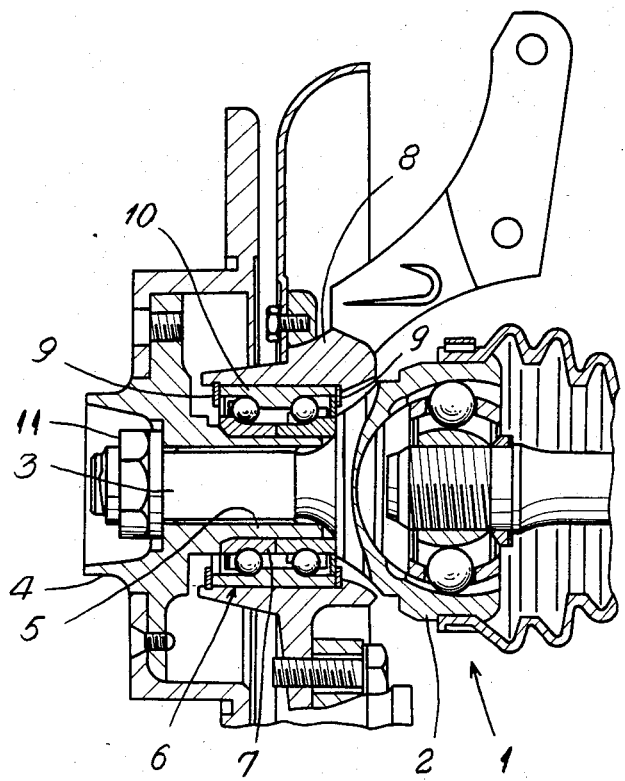
FIG. 1 is a sectional view of a conventional drive-axle bearing device for automobiles.
Figure 2:
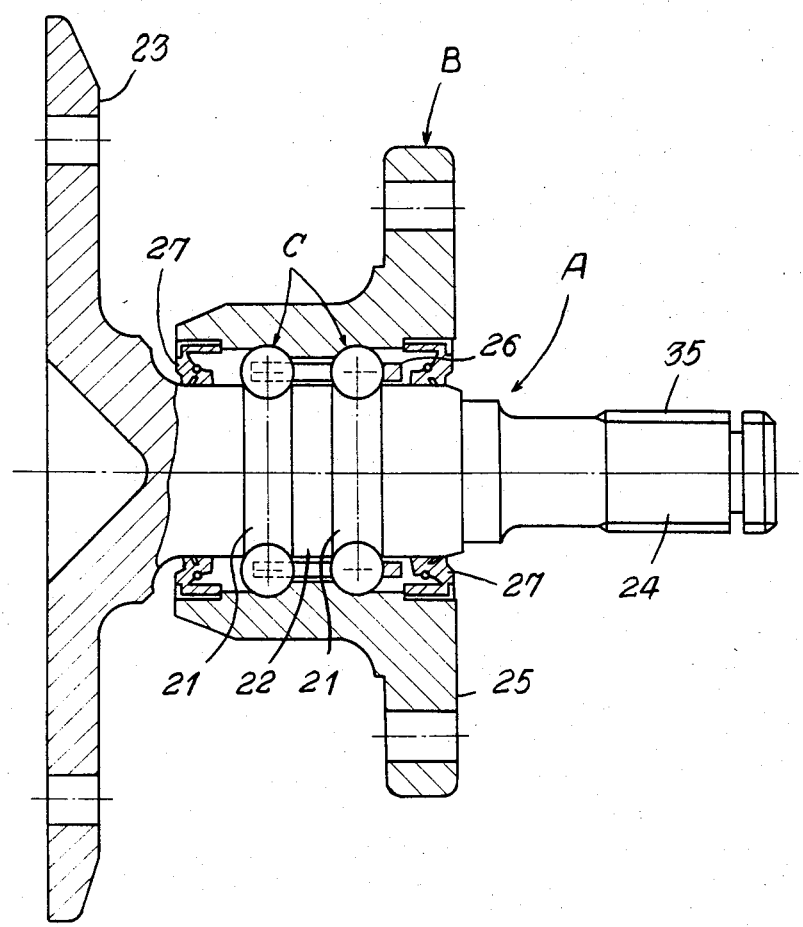
FIGS. 2 and 3 are sectional views of a bearing device according to an embodiment of the invention.

Like components or part are denoted by like reference characters throughout the figures. Referring first to FIG. 2, A denotes an inner shaft member, comprising an axially extending short shaft portion 22 having two race surfaces 21 on the outer peripheral surface thereof, a flange portion 23 for attachment of a wheel formed on one end of the shaft portion 22, and a spindle portion 24 axially extending from the other end and having formed on the projecting end thereof splines 35 or connection to the driven member (inner joint member 28 in FIG. 3), with the short shaft portion 22, flange portion 23, and spindle portion 24 being of integral construction. An outer member B has an integral flange 25 for attachment to a vehicle and corresponds to the outer ring of a bearing. Two rows of rolling elements, C, i.e., balls are interposed between the short shaft portion 22 of the inner shaft member A and the outer member B, thereby constituting a double-row angular ball bearing. Of course, the rolling elements are not limited to balls, and other forms including rollers may be employed. The numeral 26 denotes a bearing retainer having a shape which allows insertion from the spindle side of the inner shaft member A, e.g., a crown retainer made of synthetic resin. The numeral 27 denotes bearing seals fixed on the inner surface of the outer member B and being in slide contact with the outer surface of the inner short shaft portion. The short shaft portion 22 and flange portion 23 may be made as separate parts and then integrated as by welding.

Figure 3:
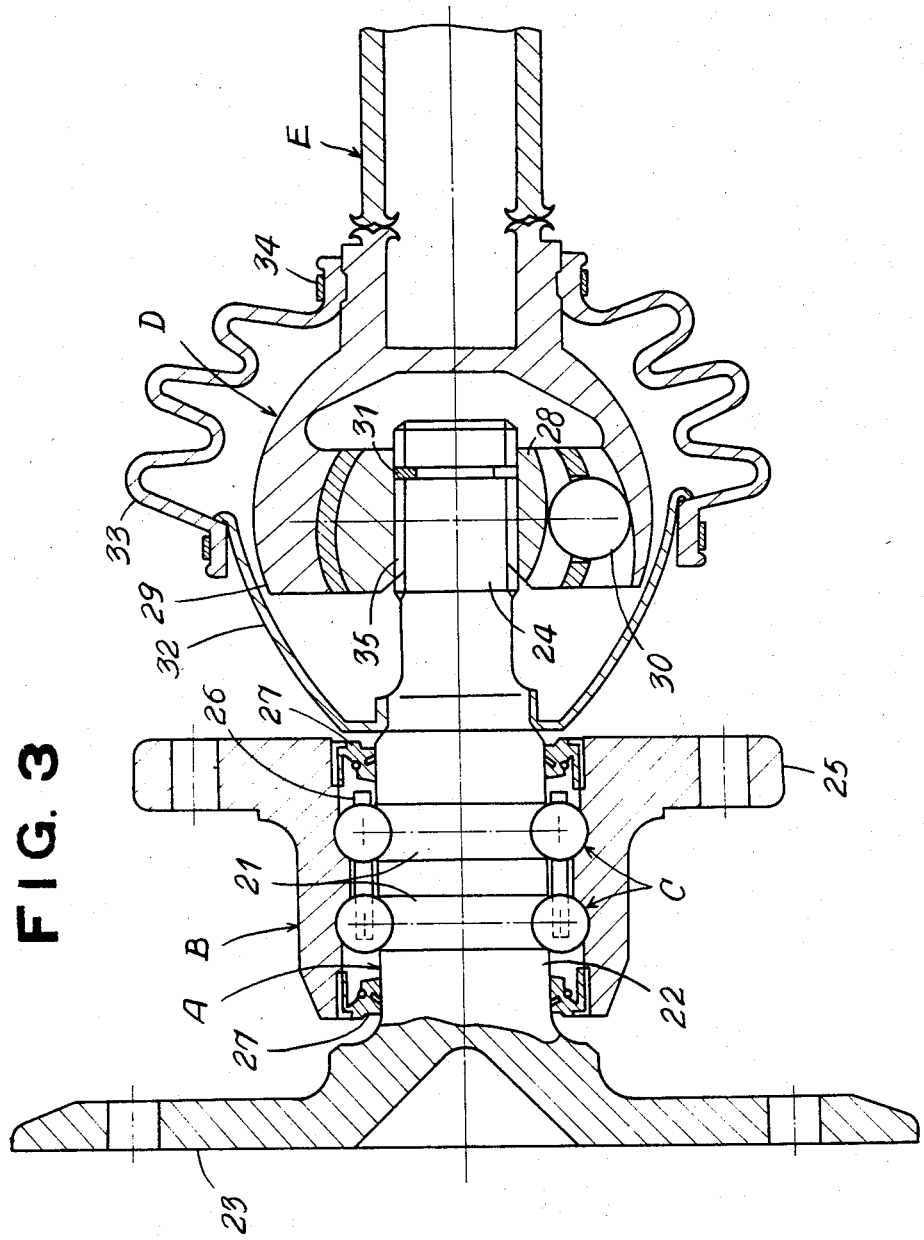

FIG. 3 shows an embodiment wherein a bearing device of the invention is applied to a drive-axle bearing device for automobiles. The character D denote a constant velocity universal joint comprising an inner joint member 28 spline-fitted on the spindle portion 24 of the inner shaft member A in the bearing device of FIG. 2, an outer joint member 29 fixed on an intermediate shaft E, and a plurality of balls 30 interposed between the two joint members 28 and 29. The numeral 31 denotes a snap ring for preventing axial movement of the spindle portion 24 and inner joint member 28; 32 denotes a boot fixing cover; 33 denotes a boot; and 34 denotes a boot band.

When it is desired to bring the bearing portion and the constant velocity universal joint close to each other, it is necessary to sufficiently hollow out the flange of the outer member to prevent the latter from abutting against the outer joint member when they form an angle with each other. Further, the drawing shows a case where the intermediate shaft E is a pipe shaft and welded to the outer joint member 29.

Figure 4:
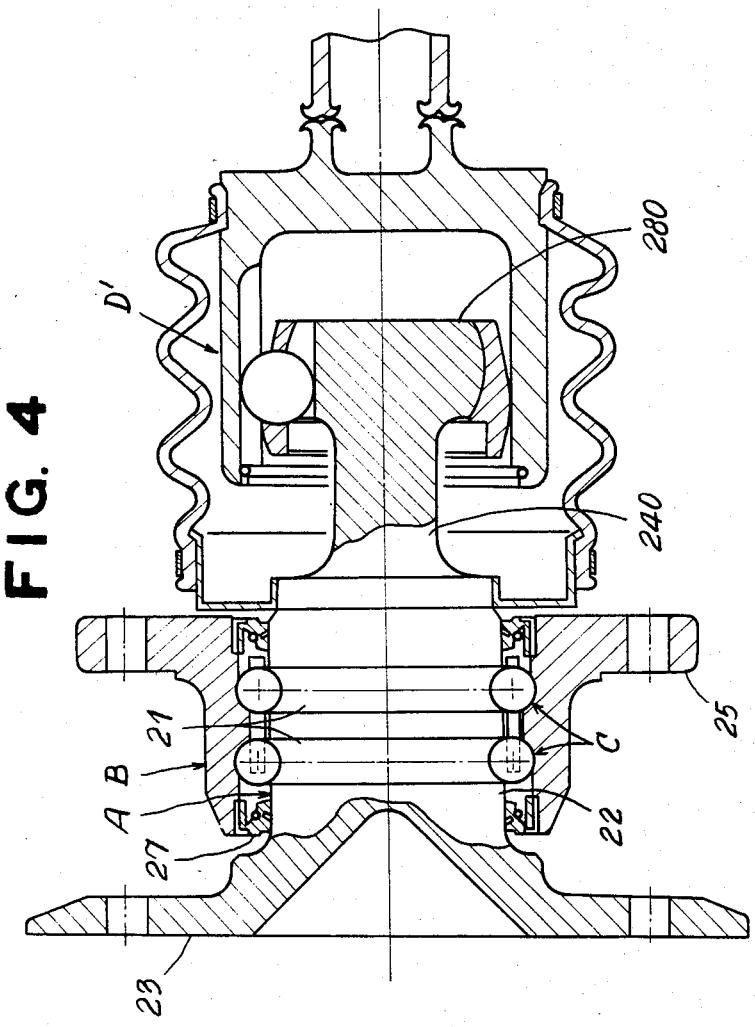
FIG. 4 is a sectional view of a bearing device according to another embodiment of the invention.

Referring to FIG. 4 showing another embodiment of the invention, a bearing device according to the invention is applied to a rear wheel of an automobile of the independent suspension type. In this case, the constant velocity universal joint D' is of the slidable type and has the inner joint member 280 formed on a solid one-piece member integral with the other end 240 of the member A. This construction is particularly adapted to be easily removable from the vehicle and replacable as a single unit. The outer peripheral surface of the short shaft portion 22 of inner shaft member A between the flange 23 and the inner joint 280 is formed with an outer diameter greater than the maximum outer diameter of the inner joint member 280. Since the opening in the outer member B must have an opening slightly larger, the inner joint member may easily pass through this opening.

The outer joint member of universal joint D' has linear axially extending ball receiving grooves, and the inner joint member extends through the axial opening of the outer joint member and has ball receiving grooves cooperating with those of the outer joint member. Torque transmitting balls are positioned in the cooperating ball receiving grooves and have a maximum outer diameter, when assembled on the inner joint member, greater than the maximum inner diameter of the opening in member B.

While the constant velocity universal joints shown and described herein are of the ball type, but the invention is not limited thereto, and other types may be employed.

As many apparently widely different embodiments of this invention may be made without departing from the spirit and scope thereof, it is to be understood that the invention is not limited to the specific embodiments thereof except as defined in the appended claims.

We claim:

1. A drive axle and bearing unit for a rear drive wheel in a vehicle of the independent suspension type, comprising:

a bearing assembly including an outer member having two races formed on a inner peripheral surface thereof and also having a radial flange integrally formed thereon for connection to a vehicle;

a unitary solid one-piece inner shaft member having formed, all integrally therewith, a radial flange at one end thereof for attachment of a wheel, an inner joint member of a constant velocity universal joint at the other end thereof having a maximum outer diameter, and two races on an outer peripheral surface thereof intermediate said ends, said outer peripheral surface having a diameter that is greater than the maximum outer diameter of said inner joint member;

two rows of rolling elements interposed between said races of said inner shaft member and said outer member;

a slidable type constant velocity universal joint assembly including an outer joint member connected to a drive shaft and having linear, axially extending ball receiving grooves, said inner joint member extending through an axial opening of said outer joint member and having ball receiving grooves cooperative with those in said outer joint member, and a plurality of torque transmitting ball elements each received in a pair of said cooperating ball receiving grooves, said elements being so constructed that said drive axle and inner joint member may be removed from said vehicle and replaced as a single unit; and an elastic boot for covering said opening of said outer joint member.

2. A drive axle and bearing unit for a rear drive wheel of a vehicle of the independent suspension type, comprising:

a bearing assembly including an outer member having a maximum inner diameter, having two races formed on an inner peripheral surface thereof and also having a radial flange integrally formed thereon for connection to a vehicle;

a unitary solid one-piece inner shaft member having formed, all intergrally therewith, a radial flange at one end thereof for attachment of a wheel, an inner joint member of a constant velocity universal joint at the other end thereof having a maximum outer diameter, and two races on an outer peripheral surface thereof intermediate said ends, said outer peripheral surface having a diameter that is greater than the maximum outer diameter of said inner joint member;

two rows of rolling elements interposed between said races of said inner shaft member and said outer member;

a slidable type constant velocity universal joint assembly including an outer joint member connected to a drive shaft and having linear, axially extending ball receiving grooves, said inner joint member extending through an axial opening of said outer joint member and having ball receiving grooves cooperative with those in said outer joint member, a plurality of torque transmitting ball elements each received in a pair of said cooperating ball receiving grooves, a maximum diameter of said torque transmitting balls when positioned in said receiving grooves being greater than the maximum inner diameter of said outer member of said bearing assembly; and said elements being so constructed that said drive axle and inner joint member may be removed from said vehicle and replaced as a single unit.

* * * * *